(12) United States Patent
Chen et al.

(10) Patent No.: US 7,939,577 B2
(45) Date of Patent: May 10, 2011

(54) RADIATION-CURABLE ALKOXY SILANIZED HYPERBRANCHED POLYESTER ACRYLATES AND PREPARATION THEREOF

(75) Inventors: Shun-Liang Chen, Kaohsiung (TW); Bud Huang, Kaohsiung (TW); Wen-Fang Shih, Kaohsiung (TW); Gang Xu, Kaohsiung (TW); Jian-Hua Zou, Kaohsiung (TW)

(73) Assignee: Eternal Chemical Co., Ltd. (TW)

( * ) Notice: Subject to any disclaimer, the term of this patent is extended or adjusted under 35 U.S.C. 154(b) by 979 days.

(21) Appl. No.: 11/522,572

(22) Filed: Sep. 18, 2006

(65) Prior Publication Data

US 2007/0066766 A1 Mar. 22, 2007

(30) Foreign Application Priority Data

Sep. 20, 2005 (TW) .............................. 94132554 A

(51) Int. Cl.
*C08G 18/28* (2006.01)
*C08G 18/64* (2006.01)

(52) U.S. Cl. .......... 522/104; 522/179; 522/183; 528/14; 528/17; 528/21; 528/23; 528/25

(58) Field of Classification Search .................... 528/44, 528/49, 85, 10, 38, 14, 17, 21, 23, 25; 522/104, 522/179, 183
See application file for complete search history.

(56) References Cited

U.S. PATENT DOCUMENTS

| | | | | |
|---|---|---|---|---|
| 4,625,012 A | * | 11/1986 | Rizk et al. | 528/28 |
| 5,418,301 A | * | 5/1995 | Hult et al. | 525/437 |
| 5,986,020 A | * | 11/1999 | Campbell et al. | 526/64 |
| 6,001,945 A | * | 12/1999 | Decker et al. | 528/26 |
| 6,716,891 B1 | * | 4/2004 | Meisenburg et al. | 522/90 |
| 7,094,826 B2 | * | 8/2006 | Martin et al. | 524/502 |
| 7,148,293 B2 | * | 12/2006 | Stumbe et al. | 525/437 |
| 2007/0027269 A1 | * | 2/2007 | Stumbe et al. | 525/445 |

* cited by examiner

*Primary Examiner* — Susan W Berman
(74) *Attorney, Agent, or Firm* — Todd E. Garabedian; Wiggin and Dana LLP

(57) ABSTRACT

The invention provides a radiation-curable alkoxy silanized hyperbranched polyester acrylate, characterized in that the radiation-curable alkoxy silanized hyperbranched polyester acrylate is produced by using a hyperbranched molecule with at least 16 functionalities as a core; acrylating or methacrylating a portion of the terminal groups of the hyperbranched molecule; and terminating a portion of the end groups of the hyperbranched molecule with an isocyanated silane coupling agent. The acrylate of the invention can be formed into a coating on polar substrates, such as glass or metal, or used as an adhesive.

19 Claims, 1 Drawing Sheet

X=

Y=

RADIATION-CURABLE ALKOXY SILANIZED HYPERBRANCHED POLYESTER ACRYLATES AND PREPARATION THEREOF

BACKGROUND OF THE INVENTION

1. Field of the Invention

The invention relates to a radiation-curable alkoxy silanized hyperbranched polyester acrylate and a preparation method thereof.

2. Description of the Prior Art

EP 0,953,000 reported a prepolymer obtained by the copolymerization of a multifunctional acrylate, an amine-terminated silane coupling agent, and an unsaturated acid. The prepolymer has a linear molecular structure, with a number average molecular weight up to 3,000 g/mole, and is radiation-curable so that it can be used as a coating for packaging.

WO 03,076,546 reported an adhesive comprised of a flexible polymer (e.g. a polyurethane), a silane coupling agent, a titanate or zirconate, and an anhydrous organic acid, which is exclusively used as adhesive for the fixation of glass windows of automobiles. The adhesive has a high adhesion to glass and good weathering properties; however, the resulting cured film is not clear due to the utilization of inorganic fillers. Therefore, the adhesive can be used only for the inside of a substrate but not the surfaces of the substrate.

The silicon-oxygen-carbon group on the structure of the silane coupling agent may be condensed with a hydroxyl in the presence of a small amount of water, for example, in moisture; therefore, it can be used in various polar substrates as an adhesion promoter. Common silane coupling agents are typically low molecular weight monomers for use as coating additives. To improve its compatibility with coatings, functionalities reactive with the components of the coatings are generally introduced into the molecular structure of the silane coupling agents. It has been a hot topic of conducting studies for obtaining functionalized silane coupling agents by means of chemical modifications for more extensive applications.

Hitherto, many patents and documents concerning the use of silane coupling agents in various coatings have been published. Also, there are many publications reporting that silane coupling agents can be used as radiation-curable coatings when they are acrylated or methacrylated and followed by being mixed with an acrylate resin or a methacrylate resin together. However, it has never been reported to employ a hyperbranched polymer as a backbone for preparing a multifunctional, macromolecular alkoxy silanized hyperbranched polyester acrylate with a high functionality and containing both an alkoxy silicon structure and an acrylate structure.

Based on extensive studies, the inventors have found that the radiation-curable alkoxy silanized hyperbranched polyester acrylate prepared by a new preparation method has not only radiation-curable acrylate groups, but also alkoxy silicon groups that can be condensed in moisture, thereby providing the advantages of a higher curing rate, a low film shrinkage, a high adhesion to substrates, and a good thermal stability, which would overcome the above-mentioned problems encountered in the prior art.

SUMMARY OF THE INVENTION

The object of the invention is to provide a radiation-curable alkoxy silanized hyperbranched polyester acrylate and a preparation method thereof.

DETAILED DESCRIPTION OF THE INVENTION

Figure 1:
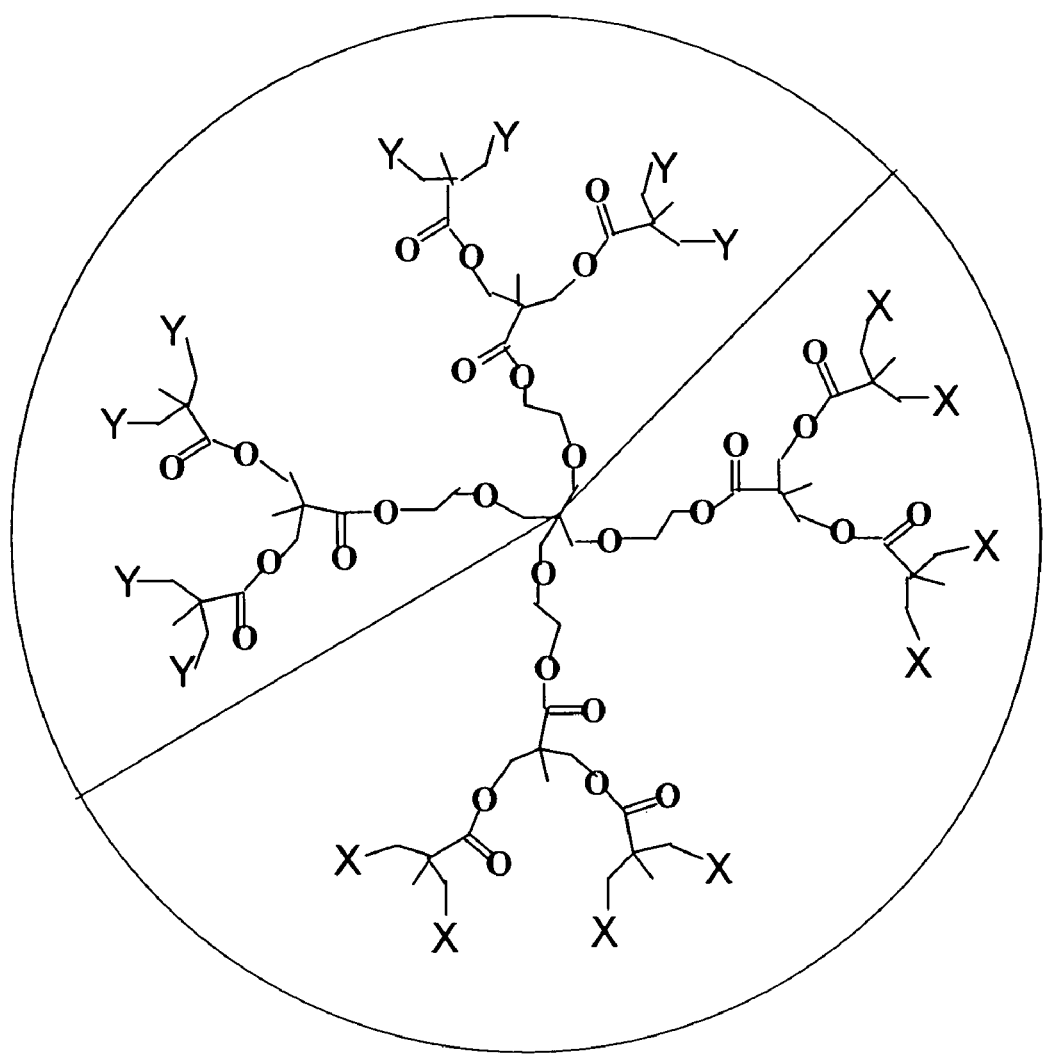
FIG. 1 is a schematic structure of the alkoxy silanized hyperbranched polyester acrylate prepared in Example 5.
Figure 1:
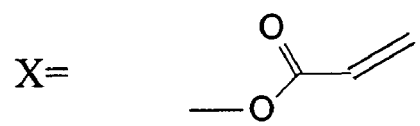
Figure 1:
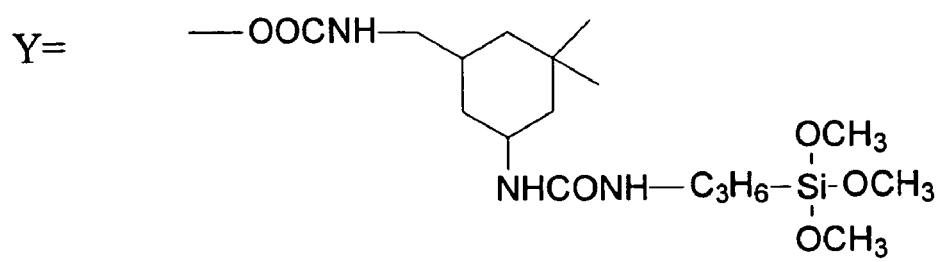

The preparation method of the alkoxy silanized hyperbranched polyester acrylate of the invention is characterized by utilizing a hyperbranched polymer having a number of terminal groups that can be modified. In a "direct process" according to the present invention, a hydroxy-terminated hyperbranched polyester with a functionality number greater than or equal to 16 is used as a reaction substrate. An unsaturated end-capping compound (A) is added to the hydroxy-terminated hyperbranched polyester in a suitable molar ratio. Alternatively, in an "indirect process" according to the present invention a difunctional saturated compound (B) or a saturated isocyanate (C) is reacted with an unsaturated end-capping compound (D) to produce an unsaturated acid ester or a monoacrylic or monomethacrylic isocyanate, which is then added to a hydroxy-terminated hyperbranched polyester with a functionality number greater than or equal to 16 in a suitable reaction molar ratio to form radiation-curable acrylate groups at the terminals of the hyperbranched polymer. Thereafter, an isocynated silane coupling agent is added to form acrylate double bonds at a portion of the terminal groups and alkoxy silicon groups at another portion of the terminal groups, so as to obtain a radiation-curable alkoxy silanized hyperbranched polyester acrylate prepolymer.

The hydroxyl-terminated hyperbranched polyester used in the invention may be an aliphatic hydroxyl-terminated polyester having a functionality number of 16 or higher, for example up to 64, specific examples of which include, but are not limited to, the series of products Boltorn™ H20, Boltorn™ H30, and Boltorn™ H40 from the Perstorp AB Company, Sweden; e.g., Boltorn™ H40 with 64 terminal hydroxyl groups or Boltorn™ H20 with 16 terminal hydroxyl groups, the latter of which has the structure of formula (1):

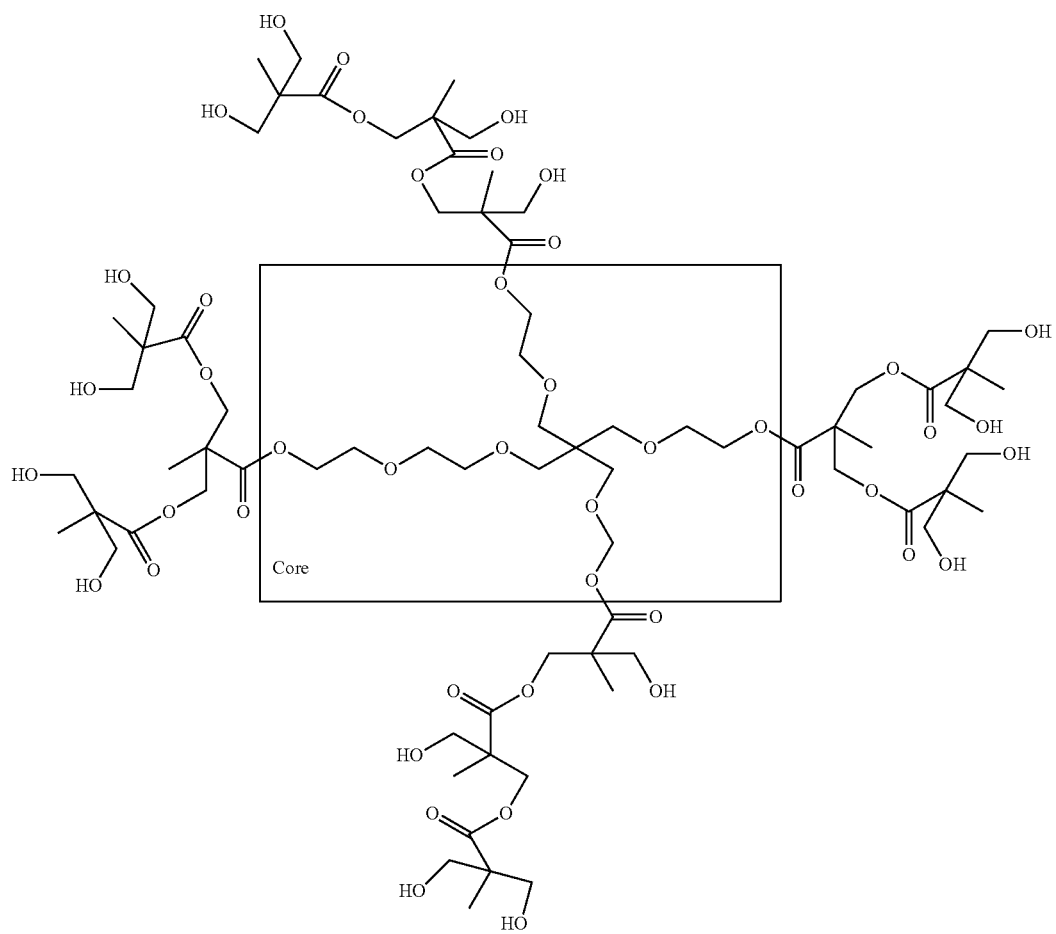

formula (1)

The species of the above-mentioned unsaturated end-capping compound (A) includes unsaturated monocarboxylic anhydride, e.g., acrylic anhydride and methacrylic anhydride; unsaturated monocarboxylic acid, e.g., acrylic acid and methacrylic acid; and unsaturated acyl chloride, e.g., acryloyl chloride and methacryloyl chloride.

The above-mentioned unsaturated acid ester is obtained from the reaction of a difunctional saturated compound (B) and an unsaturated end-capping compound (D) in an equal molar ratio; wherein the difunctional saturated compound (B) includes saturated cyclic dianhydride, such as succinic anhydride, phthalic anhydride, and glutaric anhydride.

The above-mentioned monoacrylic or monomethacrylic isocyanate is obtained from the reaction of a saturated isocyanate (C) and an unsaturated end-capping compound (D) in an equal molar ratio, wherein the saturated isocyanate (C) includes saturated diisocyanate, such as tolyl diisocyanate, hexamethylene diisocyanate, diphenylmethylene diisocyanate, and isophorone diisocyanate.

The above-mentioned unsaturated end-capping compound (D) includes unsaturated hydroxyl compounds, such as β-hydroxyethyl methacrylate, β-hydroxyethyl acrylate, 2-hydroxyl glycerol dimethacrylate, 2-hydroxyl glycerol diacrylate, 1-hydroxymethyl-3,5-dimethacrylic acid phenyl ester and 1-hydroxymethyl-3,5-diacrylic acid phenyl ester.

In the "direct process" of the invention, the hydroxyl-terminated hyperbranched polyester is reacted with the unsaturated end-capping compound (A) in the presence of a catalyst and a polymerization inhibitor and under the protection of an inert gas to obtain a desired number of terminal acrylic double bonds.

According to a preferred embodiment of the invention, in the direct process, the hydroxy-terminated hyperbranched polyester is melted at 120-180° C. and cooled to 90-120° C., and then the unsaturated end-capping compound (A) is added with stirring, and the reaction is kept at 80-120° C. in the presence of a catalyst and a polymerization inhibitor and under the protection of an inert gas for several minutes to 1 hour (preferably 15 minutes). Thereafter, a solvent is added and the reaction is continued at the same temperature for a period (preferably about 1-6 hours), such that the required number of terminal acrylic double bonds is obtained. And then an extraction is carried out to remove the byproducts and the unreacted unsaturated end-capping compound (A) and the catalyst.

According to another preferred embodiment of the invention, in the direct process, the hydroxyl-terminated hyperbranched polyester is melted at 120-180° C. and cooled to 90-120° C., then a solvent is added, and the unsaturated end-capping compound (A) is added dropwise to the reaction mixture in an ice water bath with stirring and in the presence of a catalyst and a polymerization inhibitor and under the protection of an inert gas. Thereafter, the reaction is heated and further conducted for a period (preferably about 0.5-4 hours), such that the required number of terminal acrylic double bonds is obtained. And then a neutralizing agent is added, and an extraction is employed to remove the byproducts and unreacted unsaturated end-capping compound (A) and the catalyst.

The corresponding double bond number and hydroxyl group number of the above-mentioned acrylated product may be determined by any of the methods well known to those of ordinary skill in the art, for example, $^1$H NMR.

The solvents suitable for the invention are well known to those of ordinary skill in the art, which include, for example, but are not limited to, toluene, cyclohexane, dioxane, dichloromethane, ethyl acetate, N-methylpyrrolidinone, butanone, xylene, and tetrahydrofuran, and mixtures thereof. Suitable solvents for the extractions are, for example, but not limited to, toluene, dichloromethane, chloroform, and ethyl acetate, and mixtures thereof.

The neutralizing agents suitable for the invention are well known to those ordinary skilled in the art, which include, for example, but are not limited to, saturated sodium bicarbonate.

The polymerization inhibitors suitable for the invention are well known to those of ordinary skill in the art, and include, for example, but are not limited to, p-hydroxyanisole and hydroquinone, the amount of which is about 500-4000 ppm.

The catalysts suitable for the invention are well known to those of ordinary skill in the art, and include, for example, but are not limited to, p-toluene sulfonic acid, sulfuric acid, nitrobenzene, pyridine, metallic tin compound (e.g., stannous chloride, stannous octoate, dibutyl stannous oxide, or dibutyl tin laurate), or a tertiary amine (e.g., triethylamine or N,N-dimethyl acetamide), the amount of which is about 0.5-2.0 wt %.

The inert gases suitable for the invention include nitrogen, helium and argon, and mixtures thereof.

For the direct process for the modification, if an unsaturated monocarboxylic acid is used as the unsaturated end-capping compound (A), preferably, the reaction temperature is 80-120° C., and the reaction time is 4-6 hours; if an unsaturated monoacid anhydride or an unsaturated acyl chloride is employed as the unsaturated end-capping compound (A), preferably, the reaction temperature is 20-70° C., and the reaction time is 0.5-3 hours.

In the indirect process of the invention, if the first step reaction comprises dissolving the unsaturated end-capping compound (D) and the difunctional saturated compound (B) in a molar amount equal to that of the hydroxyl groups of the unsaturated end-capping compound in a solvent, the reaction is conducted at 0-70° C. in the presence of a polymerization inhibitor and a catalyst and under the protection of an inert gas for 2-6 hours until the infrared absorption peaks corresponding to anhydride disappear. In the second step reaction, the hydroxy-terminated hyperbranched polyester is added, and the reaction is further conducted at 50-120° C. for 3-7 hours until the difference between the resulting acid value and the theoretical value is less than about 10 mg KOH/g.

In the indirect process of the invention, if the first step reaction comprises dissolving the unsaturated end-capping compound (D) and the saturated isocyanate (C) in a molar amount equal to that of the hydroxyl groups of the unsaturated end-capping compound in a solvent, the reaction is conducted at 0-70° C. in the presence of a polymerization inhibitor and a catalyst and under the protection of an inert gas for 2-6 hours until the isocyanate group value becomes half of the initial value. In the second step reaction, the hydroxy-terminated hyperbranched polyester is added, and the reaction is further conducted at 20-100° C. for 3-7 hours until the infrared absorption peaks corresponding to isocyanate group disappear.

In the indirect process of the invention, the solvent, the polymerization inhibitor, the catalyst, and the inert gas used are as defined above.

For the indirect process for modification, if the difunctional saturated compound (B) is used, preferably, the reaction temperature of the first step reaction is 40-70° C. and the reaction time is 2-4 hours; and the reaction temperature of the second step reaction is 100-120° C. and the reaction time is 3-7 hours. If the saturated isocyanate (C) is used, preferably, the reaction temperature of the first step reaction is 0-40° C. and the reaction time is 4-6 hours; and the reaction temperature of the second step reaction is 50-70° C. and the reaction time is 3-7 hours.

The synthesis method of the isocynated silane coupling agent used in the invention is achieved by reacting an amino-terminated silane coupling agent with an isocyanate, optionally in the presence of a catalyst, at 0-40° C. for 4-6 hours, wherein the catalyst is as defined above, the amount of which is about 0.5-2.0 wt %.

The above-mentioned amino-terminated silane coupling agent may be represented by the chemical formula of $H_2NR_1Si[R_2]_{3-m}[OR_3]_m$, wherein $R_1$ represents $C_{1-10}$ alkylene or arylene; $R_2$ and $R_3$, which may be the same or different, independently represent $C_{1-10}$ alkyl or aryl; and m is an integer of 1 to 3, wherein the aryl and arylene refer to a group containing a benzene ring or multiple benzene ring structure. Preferred amino-terminated silane coupling agents include, for example, the propylamino-trimethoxysilane used in the examples herein.

The subject invention is characterized in that with a hydroxyl-terminated hyperbranched polyester as a reaction substrate, a direct or an indirect process is employed for modifying the terminal hydroxyl groups of the polyester into radiation-curable active double bonds, and an isocynated silane coupling agent is added to react with the residual terminal hydroxyl groups of the hyperbranched polyester; and eventually a portion of the terminal groups becomes acrylate double bonds while another portion becomes a silane coupling agent, so as to obtain a radiation-curable hyperbranched silane coupling agent. Since the alkoxy silanized hyperbranched polyester acrylate of the invention is a radiation-curable oligomer, and the resulting cured film is colorless and transparent, it can be used as an adhesive in the inside of a substrate, and also as a varnish in surface coatings, thereby expanding the application range.

The radiation-curable alkoxy silanized hyperbranched polyester acrylate prepared by the method of the invention not only has radiation-curable acrylic double bonds, but also a alkoxy silicon structure that can be condensed and polymerized in moisture. Therefore, it would have a high polymerization rate and high adhesion to polar substrates, and can be used in the surface coatings of polar substrates, such as glass, metal, and the like, or used as an adhesive. The resulting coating has a lower shrinkage, which will eliminate the problem of the prior art associated with the poor adhesion between the cured film and the substrate due to a high curing shrinkage ratio. Moreover, the invention can provide a fast curing to form a film with ultraviolet light or low energy electron beam irradiation at room temperature, so as to improve production efficiency and save energy. Furthermore, the silicon-oxygen-carbon group on the structure of the silane coupling agent may be hydrolyzed in the presence of a small amount of water, for example, in moisture, and further condensed and polymerized with hydroxyl groups. Therefore, the silane coupling agent can be used as a coating additive to improve the adhesion to substrates.

The following examples will further illustrate the invention, but are not intended to limit the scope of the invention.

EXAMPLES

Partial Acrylation or Methacrylation of Hydroxyl-Terminated Hyperbranched Polyester

Example 1

Preparation of Partially Acrylate-Terminated Hyperbranched Polyester with H20 Containing 16 Hydroxyl Groups as a Core by Means of Direct Process 20 g (11.53 mmol) H20 was added to a 250 ml three-neck flask reactor, equipped with a magnetic stirrer, a nitrogen inlet, and a condenser water trap, then heated to 160° C. until the H20 was melted to a clear liquid, and then cooled to 100° C. Subsequently, 33.23 g (461.2 mmol) acrylic acid, 1.06 g (2000 ppm) p-hydroxyanisole, and 1.06 g (2000 ppm) p-toluene sulfonic acid were added, and the resulting mixture was stirred and kept at 100° C. After 15 minutes, 60 ml toluene and 60 ml cyclohexane were added, stirred, and heated to the reflux state of toluene, and maintained for 3 hours. After the reaction solution was cooled down, 80 ml dichloromethane was added, and the residual acrylic acid monomer and the p-toluene sulfonic acid were washed off with saturated aqueous $NaHCO_3$ solution, followed by washed with distilled water until a neutral pH was obtained. The organic layer was dried with anhydrous $Na_2SO_4$, and lastly the solvent was removed by distillation under reduced pressure (0.04 g p-hydroxyanisole was added as a supplement before the distillation) to afford a light yellow viscous liquid; 85% yield.

The resulting product was analyzed by infrared spectrometry, and the results show the characteristic peaks of the acrylic acid C═C at 1640 $cm^{-1}$, 1445 $cm^{-1}$, and 810 $cm^{-1}$, and that the characteristic peak of hydroxyl at 3318 $cm^{-1}$ was weakened.

The numbers of the double bonds and the hydroxyl groups of the resulting acrylated product calculated based on the $^1$H NMR analysis are 10.9 and 5.1, respectively.

Example 2

Esterification of the Hyperbranched Polyester H30 Containing 32 Hydroxyl Groups with Acryloyl Chloride by the Direct Process 20 g (5.55 mmol) H30 was added to the same reaction vessel as that in Example 1, heated to 160° C. until the H30 was melted to a clear liquid, and then cooled to 100° C. Subsequently, the mixture of 50 ml dioxane and 10 ml triethylamine, and 0.04 g (500 ppm) p-hydroxyanisole were added, and acryloyl chloride 8.05 g (88.80 mmol) was added dropwise slowly into the reaction vessel through a dropping funnel with stirring in an ice water bath. After the addition, the reaction was heated to 40° C. and further conducted for 2 hours, washed three times with 1% HCl, and then with saturated aqueous $NaHCO_3$ solution and distilled water until a neutral pH was obtained. Finally, the dioxane was pumped out by distillation under reduced pressure to afford a light yellow liquid; 94% yield.

The resulting product was analyzed by infrared spectrometry, the characteristic peaks of the acrylic acid C═C occurred at 1640 $cm^{-1}$, 1445 $cm^{-1}$, and 810 $cm^{-1}$, and the characteristic peak of hydroxyl at 3318 $cm^{-1}$ was weakened.

The hydroxyl value of the resulting product determined with potassium hydroxide/ethanol standard solution by a reverse titration method was 205 mg KOH/g, the theoretical value being 201 mg KOH/g.

Example 3

Using the Indirect Process, First Reacting Isophorone Diisocyanate with β-Hydroxyethyl Acrylate to Give a Monoacrylic Isocyanate, which Subsequently was Used to Modify the Hydroxy-Terminated Hyperbranched Polyester H20

With the same reaction equipment as that used in Example 1, 20.66 g (92.24 mmol) isophorone diisocyanate and 100 ml dioxane were added to a four-neck flask, and 10.7 g (92.24 mmol) β-hydroxyethyl acrylate was added dropwise with stirring while the temperature was controlled below 30° C. until the addition of the β-hydroxylethyl acrylate was completed. And then, the reaction was heated to 35-40° C. and conducted until the isocyanate group value became half of the initial value to afford the monoacrylic isocyanate. The product was cooled to below 30° C., and 20 g (11.53 mmol) H20, 0.092 g (0.2 wt %) dibutyl tin laurate, and 0.04 g (500 ppm) p-hydroxyanisole dissolved in dioxane were added through a dropping funnel. After the addition, the reaction was heated to 65° C. and further conducted for 7 hours, and then the dioxane was removed by distillation under reduced pressure to afford a light yellow viscous substance, i.e., the hydroxyl-terminated hyperbranched polyurethane polyester acrylate.

The double bond value of the resulting product determined by the bromide oxidation method was 1.6 mmol/g, the theoretical value being 1.8 mmol/g.

The resulting product was analyzed by infrared spectrometry, the characteristic peaks of the acrylic acid C═C occurred at 1640 $cm^{-1}$, 1445 $cm^{-1}$, and 810 $cm^{-1}$, the characteristic peak of urethane occurred at 1680 $cm^{-1}$, and the infrared absorption peak corresponding to isocyanate group disappeared.

The hydroxyl value of the resulting product determined with potassium hydroxide/ethanol standard solution by the reverse titration method was 97 mg KOH/g, with the theoretical value being 100.8 mg KOH/g.

Example 4

Using the Indirect Process, First Reacting Succinic Anhydride with β-Hydroxyethyl Acrylate to Give an Unsaturated Acid Ester, which Subsequently was Used to Modify the Hydroxyl-Terminated Hyperbranched Polyester H20

With the same reaction equipment as that used in Example 1, 9.2 g (92.24 mmol) succinic anhydride and 10.7 g (92.24 mmol) β-hydroxyethyl acrylate, 0.02 g (0.1 wt %) stannous chloride, and 0.04 g (500 ppm) p-hydroxyanisole were dissolved in 50 ml toluene and reacted at 70° C. for 2-4 hours. The infrared spectrum of the product was determined and the infrared peak corresponding to anhydride at 1810 $cm^{-1}$ disappeared. Subsequently, 20 g (11.53 mmol) H20 and 2 g (5 wt %) p-toluene sulfonic acid were added, stirred, heated to 100° C. and further reacted for 4-5 hours. The reaction was cooled and the residual acrylic acid monomer and p-toluene sulfonic acid were washed off with saturated aqueous $NaHCO_3$ solution. The solution was separated and the organic layer was dried with anhydrous $Na_2SO_4$. Finally, the toluene was removed by distillation under reduced pressure (0.04 g p-hydroxyanisole was added as a supplement before the distillation) to afford a light yellow viscous liquid; 82% yield.

The resulting product was analyzed by infrared spectrometry, the characteristic peaks of the acrylic acid C=C occurred at 1640 cm$^{-1}$, 1445 cm$^{-1}$, and 810 cm$^{-1}$, and the characteristic peak of hydroxyl at 3318 cm$^{-1}$ was weakened.

The hydroxyl value of the resulting product determined with potassium hydroxide/ethanol standard solution by the reverse titration method was 147 mg KOH/g, with the theoretical value being 135 mg KOH/g.

Preparation of Radiation-Curable Alkoxy Silanized Hyperbranched Polyester Acrylate from the Hydroxy-Terminated Hyperbranched Acrylate Intermediate Example 5

Preparation of the Radiation-Curable Alkoxy Silanized Hyperbranched Polyester Acrylate by Modifying the Hydroxyl-Terminated Hyperbranched Acrylate with γ-Propylaminotrimethoxysilane With the same reaction equipment as that used in Example 3, 20.66 g (92.24 mmol) isophorone diisocyanate and 100 ml dioxane were added to a four-neck flask, and 16.51 g (92.24 mmol) γ-propylaminotrimethoxysilane was added dropwise slowly with stirring while the temperature was controlled below 5° C. until the addition of γ-propylaminotrimethoxysilane was completed. The reaction was conducted until the hydroxyl value became less than 10 mg KOH/g, so as to afford an isocyanated silane coupling agent. The hydroxyl-terminated hyperbranched acrylate synthesized in Example 1 (modified H20, 26.6 g), 0.092 g (0.2 wt %) dibutyl tin laurate, and 0.04 g (500 ppm) p-hydroxyanisole dissolved in dioxane were added into the reaction vessel through a dropping funnel. After the addition, the reaction was heated to 65° C. and further conducted for 7 hours, and then the dioxane was removed by distillation under reduced pressure to afford a light yellow viscous substance.

The double bond value of the resulting product determined by the bromide oxidation method was 0.9 mmol/g, with the theoretical value of being 1.1 mmol/g.

The C, H, N, and Si contents in the product determined by a CHN-O-RAPID elemental analyzer from the Foss Heraeus Company, Germany, are shown in Table 5.

TABLE 5

|  | C | H | N | Si |
|---|---|---|---|---|
| Found (%) | 34.21 | 3.95 | 3.00 | 3.05 |
| Cal. (%) | 33.13 | 3.10 | 2.92 | 2.92 |

As seen from the above analysis, the product of this example is a radiation-curable alkoxy silanized hyperbranched polyester acrylate, the molecular structure of which is shown in FIG. 1.

Radiation-Curing of the Radiation-Curable Alkoxy Silanized Hyperbranched Polyester Acrylate and Determination of Properties of the Cured Film Obtained Therefrom Example 6

Radiation-Curing of the Radiation-Curable Alkoxy Silanized Hyperbranched Polyester Acrylate 5 g of the radiation-curable alkoxy silanized hyperbranched polyester acrylate prepared according to Example 5 and 150 mg (3 wt %) of the photo-initiator, α,α-dimethyl-α-hydroxy acetophenone (Darocur 1173) were uniformly mixed, and coated on a glass plate with a coater to form a thin film with a thickness of about 100 microns. The sample was irradiated by a LT-102 1000 W ultraviolet (UV) lamp from Lantian BEIJING at a distance of 10 cm from the lamp for 2, 4, 6, 8, and 10 seconds, respectively. The resulting cured film was analyzed by infrared spectrometry, and the double bond conversion rates at different times can be calculated based on the variation of the characteristic peak of the acrylic acid C=C at 810 cm$^{-1}$ before and after the irradiation. The obtained data is shown in Table 6.

TABLE 6

|  | Light-irradiation Time (seconds) | | | | |
|---|---|---|---|---|---|
|  | 2 | 4 | 6 | 8 | 10 |
| Double Bond Conversion Rate/UV (%) | 75.0 | 80.3 | 82.6 | 84.6 | 85.1 |

As seen from Table 6, the inventive material can be rapidly cured into a film with ultraviolet light at room temperature, which thus can greatly improve the production efficiency and save energy, and is suitable for large-scale production in industry.

Example 7

Shrinkage Ratio of the Cured Film of the Alkoxy Silanized Hyperbranched Polyester Acrylate The shrinkage ratio of the cured film was determined by measuring the densities of the non-irradiated formulation and the cured film before and after curing, respectively, with a density bottle. The shrinkage ratio calculated from the difference of the two densities was 8.7%, which is much less than the shrinkage ratio, 15-30%, of a typical cured system, and provides the cured film with a good adhesion to substrates.

Example 8

Pendulum Hardness of the Cured Film of the Alkoxy Silanized Hyperbranched Polyester Acrylate The pendulum hardness of the cured film was determined by a QBY-type Pendulum Sclerometer manufactured by TIANJIN Instrument Plant (the pendulum hardness of glass is 440 seconds). Since a number of alkoxy silicon groups remain in the alkoxy silanized hyperbranched polyester acrylate after curing, these alkoxy silicon groups will take part in the dehydration-condensation reaction with the hydroxyl silicon groups on the surface of a glass substrate under the moisture in the air, thereby greatly increasing the crosslinking density of the cured film. Moreover, the condensation of the hydroxyl silicon groups themselves can form inorganic silicon dioxide particles distributed in the coating so as to greatly enhance the hardness of the cured film. The pendulum hardness values at different times are listed in Table 7.

TABLE 7

| | Time standing indoor after irradiation (25° C.; 75% humidity)(days) | | | | |
|---|---|---|---|---|---|
| | 0 | 1 | 2 | 3 | 4 |
| Pendulum hardness (seconds) | 110 | 180 | 280 | 360 | 390 |

Example 9

Test on Adhesion to Glass with the Alkoxy Silanized Hyperbranched Polyester Acrylate as a Glass Adhesion Promoter 5 g of the radiation-curable alkoxy silanized hyperbranched polyester acrylate prepared in Example 5 and 150 mg (3 wt %) of the photo-initiator, α,α-dimethyl-α-hydroxy acetophenone (Darocur 1173) were uniformly mixed, which was then used to adhere two glass plates (2 mm in thickness, 25 mm in width, and 100 mm in length) together. The adhesion area was 25*10 mm². Thereafter, the sample was cured by irradiation with a LT-102 1000 W ultraviolet (UV) lamp from Lantian BEIJING at a distance of 10 cm from the lamp. The adhesion strength of the adhesive to the glass was determined by a tension test using the omnipotent dynamic tester DCS5000 from SHIMADZU Company, Japan. Since a number of alkoxy silicon groups remain in the alkoxy silanized hyperbranched polyester acrylate after curing, these alkoxy silicon groups will take part in the dehydration-condensation reaction with the hydroxyl silicon groups on surfaces of the glass substrates under the moisture in the air, thereby greatly increasing the adhesion strength. The adhesion strengths at different times are listed in Table 8.

TABLE 8

| | Time standing indoor after irradiation (25° C.; 75% humidity)(days) | | | | |
|---|---|---|---|---|---|
| | 0 | 1 | 2 | 3 | 4 |
| Adhesion strength (MPa) | 11.2 | 14.9 | 20.5 | 22.0 | 22.5 |

Example 10

Determination of Thermal Stability of the Cured Film of Alkoxy Silanized Hyperbranched Polyester Acrylate The thermal stability of the cured film obtained from Example 7 (after one week of having been placed under room temperature) was determined by a Thermogravimetric Analyzer Shimadzu TGA-50H. The results are shown in Table 9.

TABLE 9

| Weight loss temperature (° C., ramping rate: 10° C./min) | 250 | 380 | 500 |
|---|---|---|---|
| Weight loss percent (%) | Starting to lose weight obviously (>8) | 78 | 95 |

What is claimed is:

1. A method for preparing a radiation-curable alkoxy silanized hyperbranched polyester acrylate, comprising the steps of:

(i-1) melting a hydroxyl-terminated hyperbranched polyester with a functionality number greater than or equal to 16 at 120-180° C. and cooling the melt to 90-120° C., and then adding an unsaturated end-capping compound (A) to the melt so as to form radiation-curable acrylate groups on a portion of the terminals of the hyperbranched polymer; or;

(i-2) dissolving an unsaturated end-capped compound (D) and a saturated isocyante (C) in a molar amount equal to that of the hydroxyl groups of the unsaturated end-capping compound in a solvent; conducting the reaction at 0-70° C. in the presence of a polymerization inhibitor and a catalyst and under the protection of an inert gas until the isocyanate group value becomes half of the initial value; and then adding a hydroxyl-terminated hyperbranched polyester with a functionality number greater than or equal to 16 for a further reaction at 20-100° C. for 3-7 hours until the infrared absorption peaks corresponding to isocyanate group disappear, so as to form radiation-curable acrylate groups on a portion of the terminals of the hyperbranched polymer; and (ii) adding an isocyanated silane coupling agent to prepare the radiation-curable alkoxy silanized hyperbranched polyester acrylate with a portion of the terminal groups formed into radiation-curable acrylate groups and another portion of the terminal groups formed into alkoxy silicon groups, wherein the unsaturated end-capping compound (A) includes an unsaturated monocarboxylic anhydride, unsaturated monocarboxylic acid, or unsaturated acyl chloride; the saturated isocyanate (C) includes a saturated diisocyanate; and the unsaturated end-capping compound (D) includes an unsaturated hydroxyl compound.

2. The method according to claim 1, wherein step (i-1) comprises adding the unsaturated end-capping compound (A) with stirring in the presence of a catalyst and a polymerization inhibitor and under the protection of an inert gas, and after the reaction being conducted at 80-120° C. for 5 minutes to 1 hour, adding a solvent for a further reaction at the same temperature for 1-6 hours, depending on the desired number of the terminal acrylic double bonds, and then, removing the byproducts and unreacted unsaturated end-capping compound (A) and the catalyst by extraction.

3. The method according to claim 2, wherein the polymerization inhibitor is selected from the group consisting of p-hydroxyanisole and hydroquinone, and mixtures thereof.

4. The method according to claim 2, wherein the catalyst is selected from the group consisting of p-toluene sulfonic acid, sulfuric acid, nitrobenzene, pyridine, a metallic tin compound, and a tertiary amine, and mixtures thereof.

5. The method according to claim 2, wherein the solvent is selected from the group consisting of toluene, cyclohexane, dichloromethane, dioxane, ethyl acetate, N-methylpyrrolidinone, butanone, xylene, and tetrahydrofuran.

6. The method according to claim 1, wherein step (i-1) comprises adding a solvent, and in the presence of a catalyst and a polymerization inhibitor and under the protection of an inert gas, adding the unsaturated end-capping compound (A) to the reaction mixture in an ice water bath with stirring, after the addition, heating the reaction to 35-40° C. for a further reaction for 1-4 hours, depending on the desired number of the terminal acrylic double bonds, then, adding a neutralizing agent, and removing the byproducts and unreacted unsaturated end-capping compound (A) and the catalyst by extraction.

7. The method according to claim 6, wherein the polymerization inhibitor is selected from the group consisting of p-hydroxyanisole and hydroquinone, and mixtures thereof.

8. The method according to claim 6, wherein the catalyst is selected from the group consisting of p-toluene sulfonic acid, sulfuric acid, nitrobenzene, pyridine, a metallic tin compound, and a tertiary amine, and mixtures thereof.

9. The method according to claim 6, wherein the solvent is selected from the group consisting of toluene, cyclohexane, dichloromethane, dioxane, ethyl acetate, N-methylpyrrolidinone, butanone, xylene, and tetrahydrofuran.

10. The method according to claim 1, wherein the polymerization inhibitor is selected from the group consisting of p-hydroxyanisole and hydroquinone, and mixtures thereof.

11. The method according to claim 1, wherein the catalyst is selected from the group consisting of p-toluene sulfonic acid, sulfuric acid, nitrobenzene, pyridine, a metallic tin compound, and a tertiary amine, and mixtures thereof.

12. The method according to claim 1, wherein the solvent is selected from toluene, cyclohexane, dichloromethane, dioxane, ethyl acetate, N-methylpyrrolidinone, butanone, xylene, or tetrahydrofuran.

13. The method according to claim 1, wherein the isocyanated silane coupling agent is prepared by the reaction of an amino-terminated silane coupling agent with an isocyanate.

14. The method according to claim 13, wherein the reaction is conducted in the presence of a metallic tin compound or tertiary amine as a catalyst.

15. The method according to claim 13, wherein the chemical formula of the amino-terminated silane coupling agent is $H_2NR_1Si[R_2]_{3-m}[OR_3]_m$, in which $R_1$ represents $C_{1-10}$ alkylene or arylene; $R_2$ and $R_3$, which may be the same or different, independently represents $C_{1-10}$ alkyl or aryl; and m is 1, 2 or 3.

16. The method according to claim 1, wherein the unsaturated end-capping compound (A) is selected from the group consisting of acrylic anhydride, methacrylic anhydride, acrylic acid, methacrylic acid, acryloyl chloride, and methacryloyl chloride.

17. The method according to claim 1, wherein the saturated isocyanate (C) is selected from the group consisting of hexamethylene diisocyanate, and isophorone diisocyanate.

18. The method according to claim 1, wherein the unsaturated end-capping compound (D) is selected from the group consisting of β-hydroxyethyl methacrylate, β-hydroxyethyl acrylate, 2-hydroxyl glycerol dimethacrylate, 2-hydroxyl glycerol diacrylate, 1-hydroxymethyl-3,5-dimethylacrylic acid phenyl ester, and 1-hydroxymethyl-3,5-diacrylic acid phenyl ester.

19. A radiation-curable alkoxy silanized hyperbranched polyester acrylate prepared by the method according to claim 1, wherein the alkoxy silanized hyperbranched polyester acrylate has acrylate groups and alkoxysilyl groups at the terminal ends.

\* \* \* \* \*